(12) United States Patent
Kemper et al.

(10) Patent No.: US 12,123,477 B2
(45) Date of Patent: *Oct. 22, 2024

(54) LINE-GUIDING DEVICE COMPRISING RECESSES

(71) Applicant: TSUBAKI KABELSCHLEPP GMBH, Wenden-Gerlingen (DE)

(72) Inventors: Uwe Kemper, Kreuztal (DE); Thomas Wendig, Katzwinkel/Elkhausen (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 335 days.

This patent is subject to a terminal disclaimer.

(21) Appl. No.: 17/619,462

(22) PCT Filed: Jun. 16, 2020

(86) PCT No.: PCT/EP2020/066566
§ 371 (c)(1),
(2) Date: Dec. 15, 2021

(87) PCT Pub. No.: WO2020/254293
PCT Pub. Date: Dec. 24, 2020

(65) Prior Publication Data
US 2022/0252137 A1   Aug. 11, 2022

(30) Foreign Application Priority Data
Jun. 17, 2019   (DE) .............. 10 2019 116 369.2

(51) Int. Cl.
*F16G 13/16*   (2006.01)
*F16G 15/00*   (2006.01)

(52) U.S. Cl.
CPC .................. *F16G 13/16* (2013.01)

(58) Field of Classification Search
CPC .............................. F16G 13/16; F16G 13/00
See application file for complete search history.

(56) References Cited

U.S. PATENT DOCUMENTS 6,425,238 B1 *   7/2002   Blase ................ H02G 11/006
248/51
2021/0364063 A1*  11/2021  Strack ................... F16G 13/07

FOREIGN PATENT DOCUMENTS

DE   202006006638 U1 *  7/2006  ............ F16G 13/16
EP       1283381 A2     2/2003
(Continued)

OTHER PUBLICATIONS

English translate (DE202006006638U1), retrieved date Jan. 6, 2024.*

*Primary Examiner* — Mohammed S. Alawadi
(74) *Attorney, Agent, or Firm* — BainwoodHuang

(57) ABSTRACT

A line-guiding device includes links connected to one another in an articulated manner and which form a loop consisting of an upper strand, a deflection region, and a lower strand. Adjacent links can pivot relative to one another about a pivot axis. The pivot axes are located closer to a loop inner side than to a loop outer side at least in some of the links. Each link has two side flaps opposite one another. Side flaps of adjacent links form at least one running surface on the loop inner side. At least some of the links have a roller projecting from the running surface. The upper strand and the lower strand can abut over the running surface such that the upper strand and the lower strand can move by means of the rollers. The running surface in at least some of the links is interrupted by recesses.

9 Claims, 5 Drawing Sheets

(56) References Cited

FOREIGN PATENT DOCUMENTS

Figure 1:
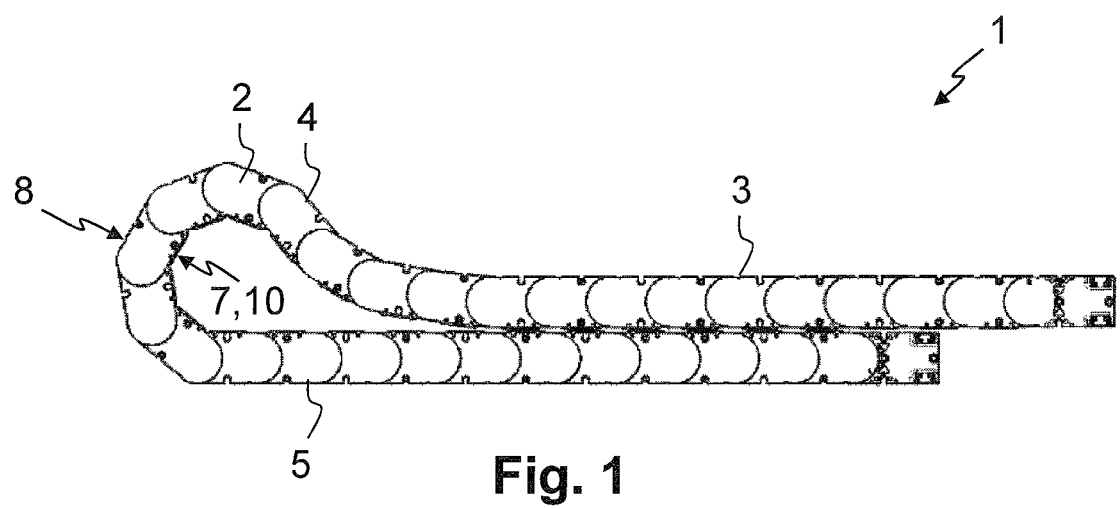

EP    02018866 A2    2/2003
EP    2010800 A1    1/2009

* cited by examiner

LINE-GUIDING DEVICE COMPRISING RECESSES

The present invention relates to a line-guiding device, in particular for guiding cables and hoses. A line-guiding device of this type can also be referred to as a cable carrier.

A wide variety of line-guiding devices are known from the prior art. Lines such as cables or hoses can be guided by them between two components which can move relative to each other, without the lines being damaged by the movement of the components.

A generic line-guiding device is known from EP 2 010 800. The line-guiding device described therein has a number of chain links which are connected to one another in an articulated fashion and in each case have two side tabs situated opposite each other. The line-guiding device can be moved such that it forms a loop consisting of a lower run, an upper run, and a deflection region connecting the latter. Two respective neighboring side tabs can be pivoted about a common pivot axis relative to each other, wherein the distance of the pivot axis from the narrow side that faces the inside of the loop is less than from the narrow side that faces the outside of the loop. In this respect, the pivot axes are arranged off-center.

In the case of the line-guiding device according to EP 2 010 800, those narrow sides of the side tabs which face the inside of the loop form, in a straight configuration, a continuous running surface on which the opposite run can slide or, if at least some of the cable carrier's side tabs of the opposite run are provided with rollers, can roll. "Continuous" is taken in this connection to mean that the gap in the running surface at the transition from one side tab to the next is limited to the unavoidable play. It is intended that the continuous running surface enables rolling with largely no loss of energy and low noise.

However, in the case of the line-guiding device according to EP 2 010 800, liquid can collect on the running surface. In particular, when the line-guiding device is used in the open, water can get onto the running surface. As a result, the adhesion of the rollers to the running surface can be reduced. The rollers can float because of the liquid such that the rollers slide over the running surface instead of rolling on it. This can be referred to as hydrodynamic slip.

Consequently, starting from the disadvantages known from the prior art, the object of the present invention is to further develop a generic line-guiding device such that the rollers have improved adhesion to the running surface when there is liquid on the running surface.

This object is achieved by the features which are disclosed herein. The features disclosed herein relate to advantageous developments. It should be pointed out that the features disclosed herein can be combined with one another in any technologically meaningful way and define further embodiments of the invention. Furthermore, the features are specified and explained in detail in the description, wherein further preferred embodiments of the invention are described.

According to the invention, a line-guiding device is presented with a plurality of links which are connected to one another in an articulated fashion and form a loop consisting of an upper run, a deflection region, and a lower run. Neighboring links can be pivoted relative to each other about a respective pivot axis. The pivot axes are, at least in the case of some of the links and preferably in the case of all the links, arranged closer to the loop inner side than the loop outer side. The links each have two side tabs situated opposite each other. Side tabs of neighboring links form at least one running surface on the loop inner side. At least some of the links have a respective roller projecting from the running surface. The upper run and the lower run can bear against each other via the running surface in such a way that the upper run and the lower run can be moved relative to each other by means of the rollers. For at least some of the links, the running surface is interrupted by a respective plurality of depressions.

By means of the line-guiding device described, lines such as cables or hoses can be guided between two components which can move relative to each other, without the lines being damaged by the movement of the components.

The line-guiding device has a plurality of links connected to one another in an articulated fashion. By limiting the angle of pivot by which neighboring links can be pivoted relative to one another, the lines can be protected from being bent with too small a bending radius to the extent that they are damaged. The links are preferably lined up in a row and thus form the line-guiding device. The links are preferably formed from a plastic. This refers to all the elements of the links.

The links form a loop consisting of an upper run and a lower run, between which a deflection region is arranged. In the region of the upper run and the lower run, the links are preferably arranged in a straight line to the extent that the description a straight configuration can be used. In the deflection region, the links are pivoted relative to one another to the extent that the description a bent configuration can be used. If the line-guiding device is arranged between two components which can move relative to each other, the two components can be displaced relative to each other with displacement of the deflection region.

A direction of travel of the line-guiding device is defined along the row of links. In the region of the upper run and the lower run, the direction of travel of all the links is the same. The direction of travel in the region of the upper run and the direction of travel in the region of the lower run are opposite to each other. In the region of the deflection region, the direction of travel changes from link to link.

Neighboring links can be pivoted relative to one another about a respective pivot axis which is arranged in the case of at least some of the links closer to the inside of the loop than the outside of the loop. In this respect, the pivot axes are arranged off-center. The pivot axes are preferably arranged, at all transitions between two neighboring links, closer to the inside of the loop than to the outside of the loop.

The links in each case have two side tabs situated opposite each other. Two tracks of side tabs situated opposite each other are thus formed by the side tabs of the links. The side tabs are preferably connected to each other via cross-pieces. At least one running surface is formed by side tabs of neighboring links on the side of the latter facing the inside of the loop, the loop inner side. A respective running surface is preferably formed by the side tabs of the two tracks. Each of the two tracks therefore has a respective running surface. The following description applies equally to both running surfaces. It is, however, also possible that only one of the two tracks of side tabs has a running surface formed as described. The upper run and the lower run can bear against each other by means of the running surface. The running surface preferably has a width in the range of 5 to 200 mm, in particular in the range of 10 to 100 mm, transversely to the direction of travel of the line-guiding device. So that the upper run and the lower run can be displaced relative to each other particularly easily and smoothly, some of the links have rollers which project from the running surface. The rollers of the upper run can roll on the running surface of the lower run, and the rollers of the lower run can roll on the running surface of the upper run. The rollers are in contact with the running surface in the region of the upper run and the lower run but not in the region of the deflection region. The line-guiding device is in a straight configuration in the region of the upper run and in the region of the lower run. The rollers therefore come into contact with the running surface in the straight configuration. The following description of the rolling of the roller on the running surface correspondingly relates only to the straight configuration.

In the case of the line-guiding device described, the rollers have an improved adhesion to the running surface when there is liquid on the running surface. For this purpose, for at least some of the links, the running surface is interrupted by a plurality of depressions.

The depressions allow the liquid to escape at the sides, as a result of which the rollers reestablish contact with the running surface and can roll again. The depressions in the running surface have manufacturing advantages, in particular compared with a profiled roller, because the depressions can be produced more cost-effectively and more simply than a comparable profile on the roller. The depressions are preferably arranged offset relative to one another. As a result, a reduction in the generation of noise can be obtained when the rollers roll over the depressions.

According to a preferred embodiment of the line-guiding device, the depressions are arranged in pairs in such a way that in each case one pair of depressions continuously interrupts the running surface between edges of the running surface transversely to the direction of travel of the line-guiding device.

The edges under consideration here are the outermost points of the running surface when the latter is considered perpendicular to the direction of travel of the line-guiding device. In this embodiment, the depressions therefore extend over the whole running surface such that the running surface is interrupted completely. By virtue of such a continuous interruption, the liquid can be collected by the running surface over its entire width and be discharged into regions outside the running surface.

According to a further preferred embodiment of the line-guiding device, the depressions are arranged in pairs, wherein the depressions of a pair contact each other at just one point of contact.

It has been shown that such an arrangement reduces the generation of noise particularly well.

Two depressions of a pair which contact each other at a point of contact should here be considered here as continuous such that these two depressions together can together interrupt the running surface continuously between the edges of the running surface transversely to the direction of travel.

According to a further preferred embodiment of the line-guiding device, each of the side tabs of a link in each case has an inner tab, an outer tab, and a central tab, wherein the depressions are provided only on the central tabs.

The production of the individual tabs can be facilitated by this design. The depressions only need to be provided for the central tabs, whereas the outer tabs and inner tabs can be produced without them and in this respect more simply.

If central tabs of different types are provided, it is preferred that the depressions are provided only for central tabs of a single type. As a result, the production process can be further simplified.

The links can be designed as self-pivoting in particular by virtue of the design with an outer tab, an inner tab, and a central tab.

According to a further preferred embodiment of the line-guiding device, the depressions have a respective depth in the range of 1 to 20% of their length in the direction of travel of the line-guiding device. According to a further preferred embodiment of the line-guiding device, the depressions have a respective depth in the range of 0.5 to 2 mm.

The depth of the depressions is the distance between the respective deepest point of the depression and the running surface, measured perpendicular to the running surface.

The said depth is sufficient in most applications for liquid to be able to drain from the running surface sufficiently well.

According to a further preferred embodiment of the line-guiding device, the depressions have a respective width transversely to the direction of travel of the line-guiding device in the range of 100 to 300% of their respective length in the direction of travel of the line-guiding device. According to a further preferred embodiment of the line-guiding device, the depressions have a respective width transversely to the direction of travel of the line-guiding device in the range of 5 to 20 mm.

The said width is sufficient in most applications for liquid to be able to drain from the running surface sufficiently well.

According to a further preferred embodiment of the line-guiding device, the running surface is interrupted at at least some of the transitions between neighboring links in such a way that a part, formed by a first one of the two neighboring links, of the running surface has a recess, and that a part, formed by a second one of the two neighboring links, of the running surface has a pin which engages in the recess, thus forming a gap.

In the present embodiment, the rollers can roll on the running surface in particular with no loss of energy and low noise. It is thus not necessary to configure gaps between neighboring links which are particularly narrow. Instead, the running surface has gaps which are formed between a recess and a pin at at least some of the transitions between two neighboring links. The recess is formed in the part of the running surface of the first link involved in the transition, and the pin in the running surface of the second link involved in the transition. Both the recess and the pin are defined as part of the two-dimensional running surface. The pin can engage in the recess, wherein a gap is formed between the recess and the pin. This gap is likewise defined as two-dimensional within the plane of the running surface. The gap extends between the edge of the recess and the edge of the pin. This gap can in particular be designed to be considerably larger than is technically necessary. The above described disadvantages which result from a gap with a minimum gap width are consequently obviated.

The reduction in energy loss and noise generation when the rollers roll on the running surface can therefore be reduced without minimizing the gap width because the gaps between the recesses and the pins do not significantly influence the movement of the rollers. This differs from the case of a gap which is formed transversely to the direction of movement of a roller. In the case of such a gap, the roller penetrates the gap when it runs over the latter. In that case, the lowest point of the roller moves into the gap and in this respect drops below the plane of the running surface. This can be prevented by designing the transitions with a recess and a pin.

The line-guiding device is preferably designed in such a way that the rollers can come into contact with a part of the running surface at the transition between the neighboring links at all times. For this purpose, it is preferred that the rolling surface of the rollers is wider than the extent of the recess transverse to the direction of travel of the line-guiding device at the point at which the roller first encounters the pin of the second link when it moves from a first link to a second link. The width of the rolling surface is defined transversely to the direction of travel of the line-guiding device. In that case, if the roller moves over a transition from a first link to a second link, the corresponding rolling surface is at all times in contact with that part of the running surface which is formed by the first link and/or with that part of the running surface which is formed by the second link. The whole rolling surface first comes into contact with that part of the running surface which is formed by the first link. When the roller reaches the region of the recess, the rolling surface loses contact with the running surface only at its center. However, this contact remains at the edge regions of the rolling surface. The central region of the rolling surface then comes into contact with that part of the running surface which is formed by the second link. At that moment, the rolling surface is in contact via its edge regions with that part of the running surface which is formed by the first link and at the same time via its central region with that part of the running surface which is formed by the second link. Only then does the rolling surface lose contact with that part of the running surface which is formed by the first link. Therefore at least a part of the rolling surface is in contact with a part of the running surface at all times. This also applies if the gap is considerably larger than technically necessary. Minimization of the gap width is therefore not necessary.

It is, however, not necessary that the rollers can be in contact with a part of the running surface at all times at the transition between two neighboring links. Reduction in the generation of noise and the accompanying loss of energy can be readily obtained if the rollers are for just a short period of time not in contact with any part of the running surface at the transition between two neighboring links. The distance to be spanned by a roller without any contact with the running surface can be considerably shorter than the gap width by virtue of the design of the transition between neighboring links with a recess and a pin. A significant reduction in the generation of noise can be obtained without any minimization of the gap width.

The edges of the running surface can also be formed in the region of the gap by edges of the gap. Thus, a pair of depressions can be provided in the pin, wherein the two depressions together completely interrupt the pin between its edges transversely to the direction of travel of the line-guiding device.

According to a further preferred embodiment of the line-guiding device, the rollers have a respective rolling surface which is narrower than the recesses transversely to the direction of travel of the line-guiding device.

The width of the recess is defined transversely to the direction of travel of the line-guiding device. As long as the recess has a variable extent in this direction, the width should be understood as the maximum extent. In the present embodiment, the rolling surface is therefore narrower than the recess at its widest point. For example, the rolling surface can have a width of 15 mm and the recess a width of 17 mm. In this embodiment, it is preferred that the gap between the recess and the pin at least in some places and preferably at each point runs obliquely to the direction of travel of the line-guiding device. For example, the gap can resemble a U-shape or V-shape and be designed mirror-symmetrically with respect to the direction of travel of the line-guiding device. By virtue of a gap arranged obliquely in this way, the roller can travel over the gap without dipping into it, even when the recess is wider than the rolling surface.

According to a further preferred embodiment of the line-guiding device, the recesses have a respective length in the direction of travel of the line-guiding device which is greater than a gap width of the gap formed with the respective recess.

In particular in this embodiment, the rollers can be in contact with a part of the running surface at all times at the transition between two neighboring links.

According to a further preferred embodiment of the line-guiding device, the gaps between the edges of the running surface transversely to the direction of travel of the line-guiding device are designed as continuous.

The edges under consideration here are the outermost points of the running surface when the latter is considered perpendicular to the direction of travel of the line-guiding device. In this embodiment, the gaps therefore extend over the whole running surface such that the running surface is completely interrupted. However, the fact that the gaps extend transversely to the direction of travel of the line-guiding device over the whole running surface does not mean that the gaps only run transversely to the direction of travel of the line-guiding device. Instead, the design of the gaps between the respective recess and the respective pin entails that the gaps also run at least partially in or counter to the direction of travel of the line-guiding device.

According to a further preferred embodiment of the line-guiding device, the gaps have a respective gap width which corresponds to between 2 and 20% of the extent of the running surface transversely to the direction of travel of the line-guiding device.

The gap width is the shortest distance between the edge of the recess and the edge of the associated pin. The gap width can therefore have a different size at different points of the gap. In the present embodiment, the gap width is at each point in the range of 2 to 20% of the extent of the side tabs transversely to the direction of travel of the line-guiding device. The gap width is preferably constant. It is also preferred that the gap width is the same for all the gaps. In the case of a non-constant gap width, this means that the profile of the gap width is preferably the same for all the gaps and that therefore all the gaps have the same shape and size. The gap width is preferably in the range of 5 to 20 mm.

According to a further preferred embodiment of the line-guiding device, the pins are designed so that they are symmetrical with respect to the direction of travel of the line-guiding device.

The symmetrical design of the pins makes it possible to prevent forces which could cause the rollers to run noisily being exerted on the rollers transversely to the direction of travel of the line-guiding device.

The recesses are also preferably designed so that they are symmetrical with respect to the direction of travel of the line-guiding device.

According to a further preferred embodiment of the line-guiding device, the pins are in each case designed such that they taper to a tip.

The tapering pins make it possible to prevent the rollers encountering forces transversely to the running direction of the rollers, as a result of which noises could occur.

The recesses are also preferably in each case designed such they taper to a tip.

Not all the transitions between two links must be designed with a recess and a pin, as described. The greater the number of transitions configured in this way, the more that the loss of energy and noise generation can be reduced. However, a reduction in the loss of energy and generation of noise is already achieved with individual transitions designed in this way. The preferred embodiment of the line-guiding device is the one in which the running surface is interrupted at least at all the transitions between two rollerless links by a gap formed between a respective pin and a respective recess.

The construction can be simplified by this design because the number of different parts which need to be produced is small and at the same time, in the case of the links with a roller which are more complex to produce, the formation of a pin and a recess can be dispensed with. The running surface is preferably, in the case of links with a roller, interrupted by a gap formed between a respective pin and a respective recess at at least one of the two transitions to the respective neighboring link.

The links can also be designed so that they are self-pivoting. The two side tabs of a link can, for example, in each case be formed from an outer tab, an inner tab, and a central tab, wherein the outer tab and the inner tab, on the one hand, and the central tab, on the other hand, are designed so that they can pivot relative to one another. In that case, the running surface is interrupted by a gap formed between a respective pin and a respective recess at the transition arranged inside the link between the outer tab and the inner tab, on the one hand, and the central tab, on the other hand. Such an interruption of the running surface inside a link can be provided for all the links or for some of the links.

Figure 2:
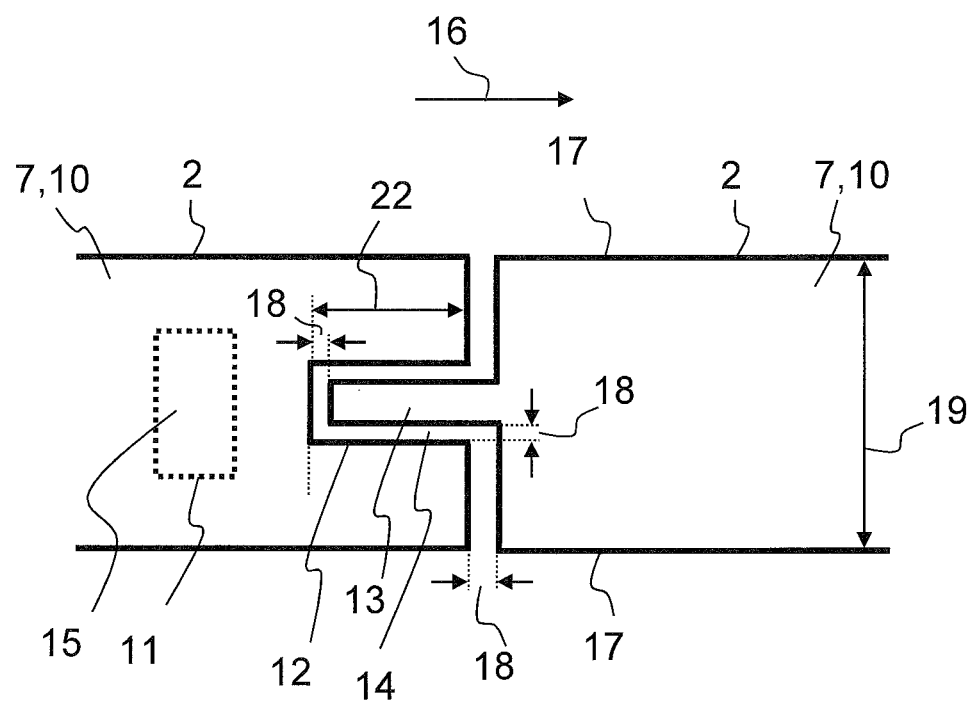
Figure 3:
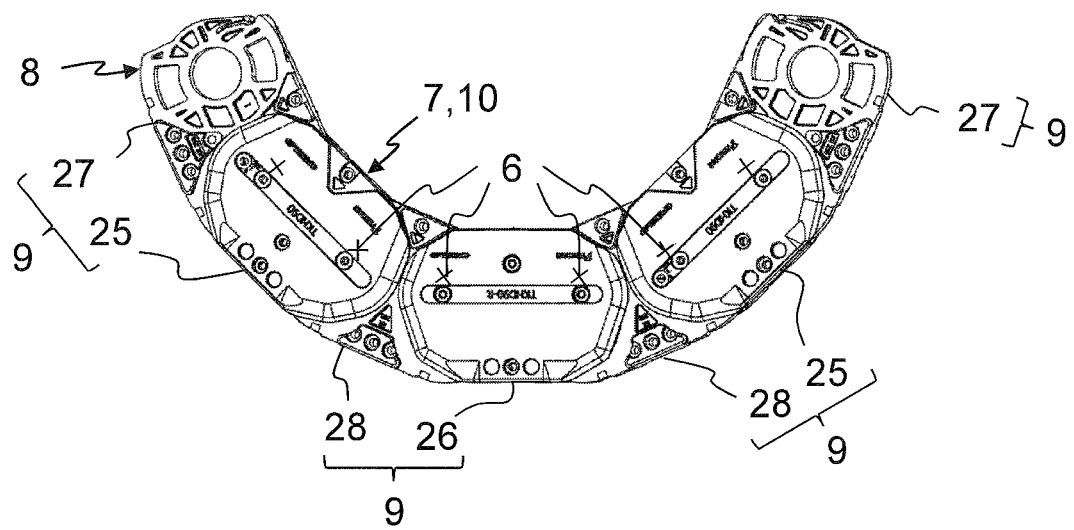
Figure 4:
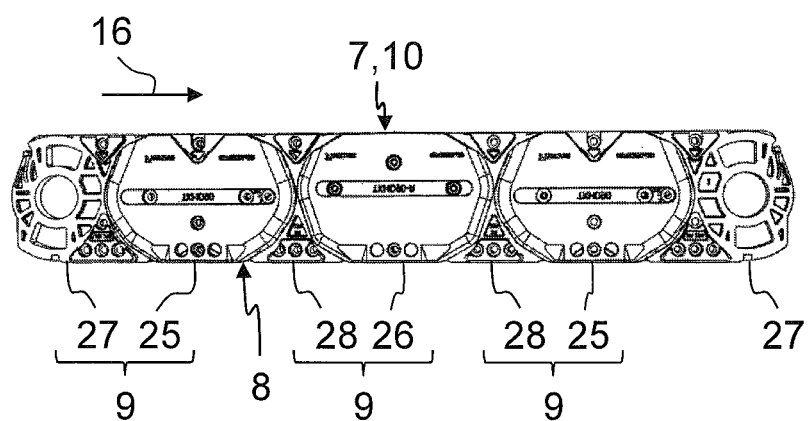
Figure 5:
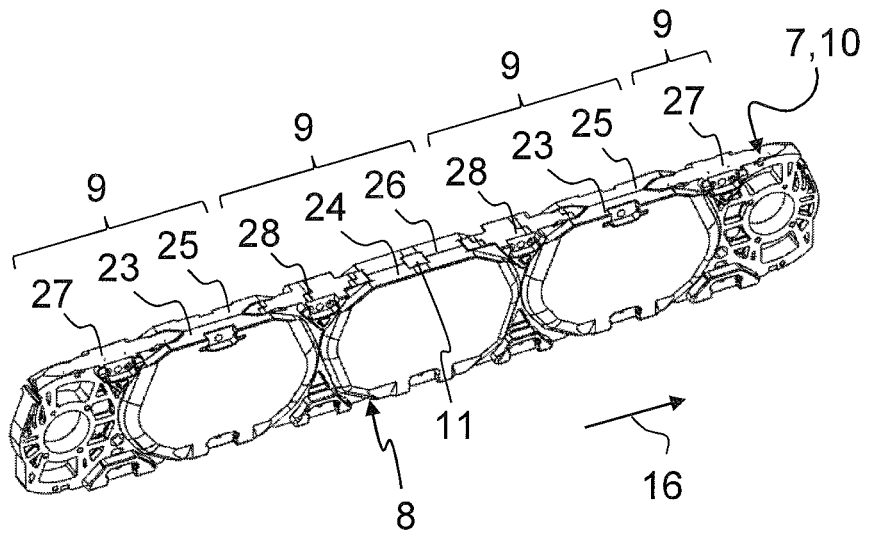
Figure 6:
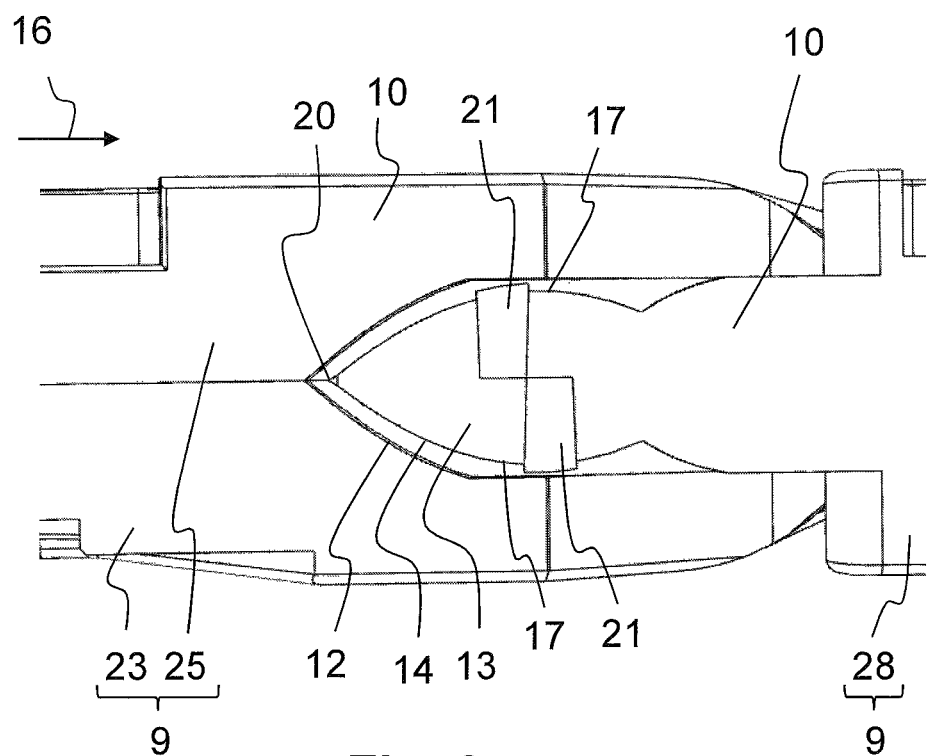
Figure 7:
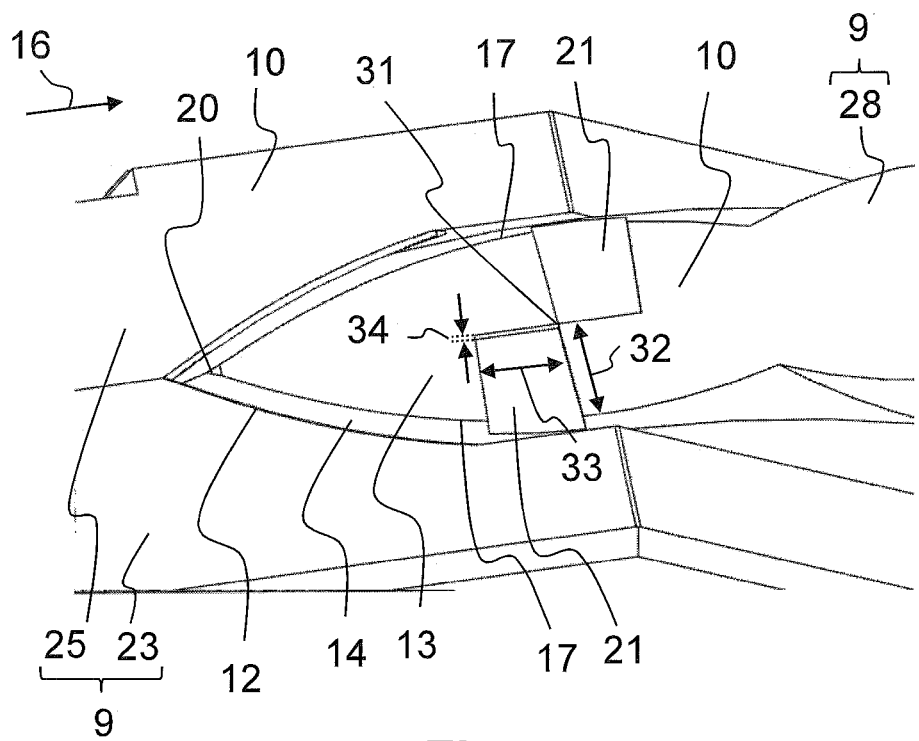
Figure 8:
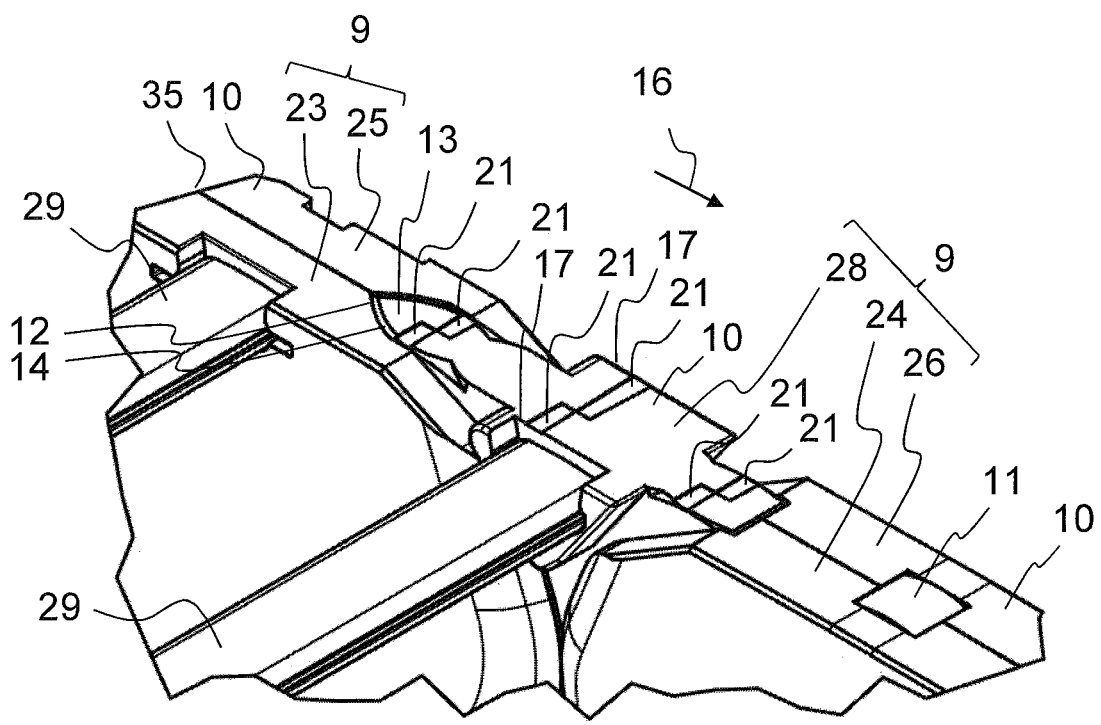
Figure 9:
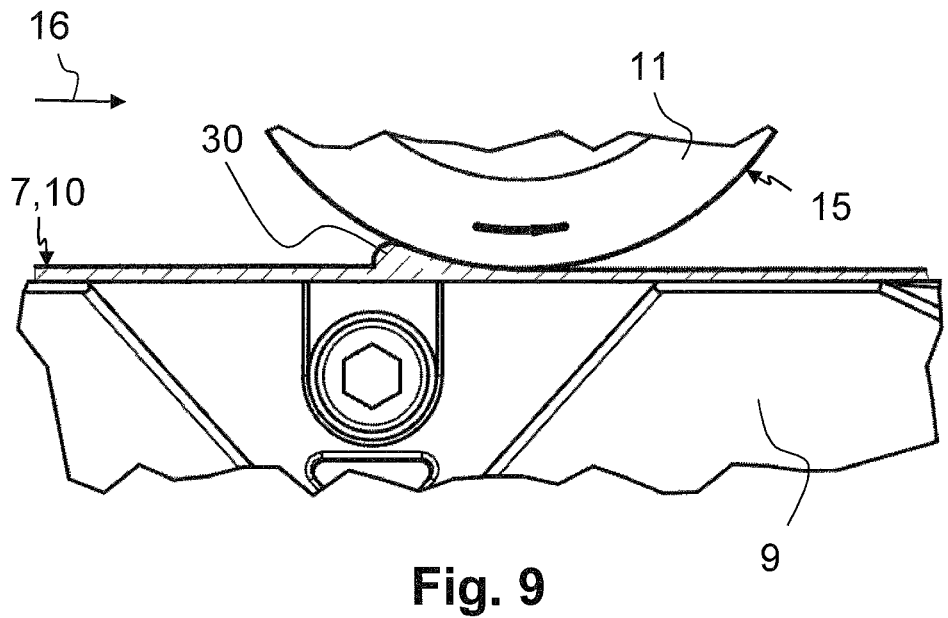
Figure 10:
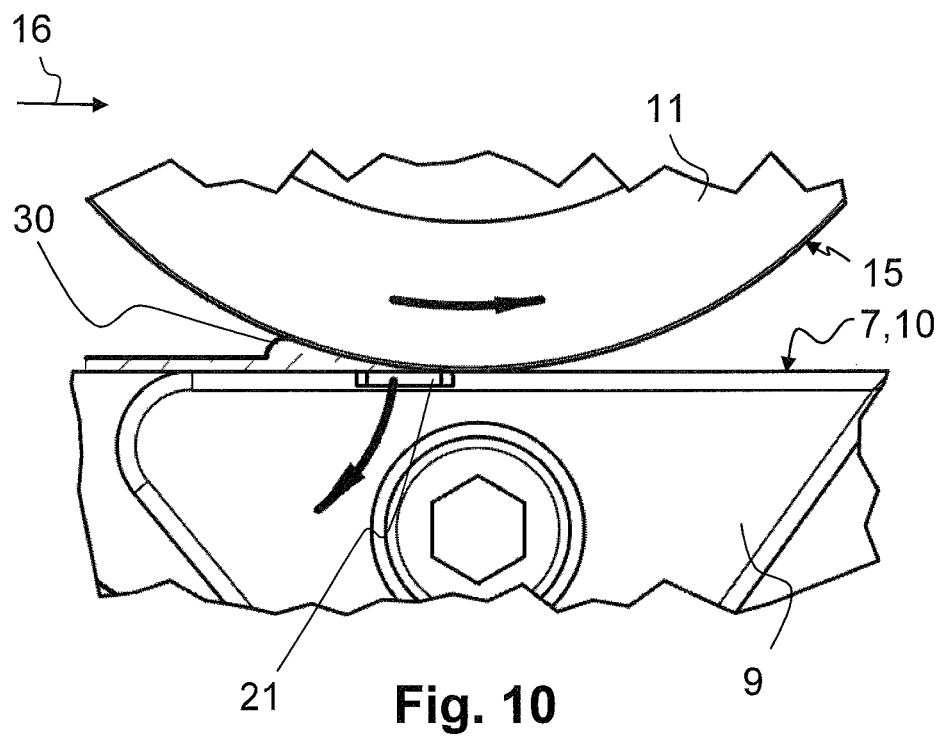

The invention and the technical environment are explained in detail below with the aid of the drawings. It should be pointed out that it is not intended that the invention is limited by the exemplary embodiments shown. In particular, unless explicitly stated otherwise, it is also possible to extract partial aspects of the content explained in the drawings and combine them with other constituent parts and insights from the present description and/or drawings. It should in particular be pointed out that the drawings and in particular the proportions shown are only schematic. The same reference numerals refer to the same objects such that explanations may additionally be drawn from other drawings. In the drawings:

FIG. 1 shows a side view of a line-guiding device according to the invention, FIG. 2 shows a schematic plan view of the running surface at a transition between two links of the line-guiding device from FIG. 1, FIG. 3 shows a side view of the side tabs of some links, in a bent configuration, of the line-guiding device from FIG. 1, FIG. 4 shows a side view of the side tabs from FIG. 3 in a straight configuration, FIG. 5 shows a perspective view of the side tabs from FIGS. 3 and 4 in a straight configuration, FIG. 6 shows a plan view of the running surface at a transition between two neighboring links of the line-guiding device from FIG. 1 with the side tabs from FIGS. 3 to 5 in a straight configuration, FIG. 7 shows a first perspective view of the running surface at the transition also shown in FIG. 6, FIG. 8 shows a second perspective view of the running surface at the transition also shown in FIGS. 6 and 7, FIG. 9 shows a first side view of a side tab and a roller, rolling thereon, of the line-guiding device from FIG. 1, and FIG. 10 shows a second side view of the side tab from FIG. 9.

FIG. 1 shows a side view of a line-guiding device 1 according to the invention with a plurality of links 2 connected to one another in an articulated fashion. One of the links 2 is provided with a reference numeral by way of example. The line-guiding device 1 forms a loop consisting of an upper run 3, a deflection region 4, and a lower run 5. A loop inner side 7 and a loop outer side 8 are marked. A running surface 10 is formed on the loop inner side 7. The upper run 3 and the lower run 4 can bear against each other via the running surface 10 in such a way that the upper run 3 and the lower run 4 can be displaced relative to each other by means of rollers 11 (shown in FIG. 5).

FIG. 2 shows a schematic plan view of the running surface 10 at a transition between two links 2 of the line-guiding device 1 from FIG. 1. It can be seen that the running surface 10 is interrupted at the transition shown between the two neighboring links 2 in such a way that a part, formed by the link of the two neighboring links 2 which is shown here on the left, of the running surface 10 has a recess 12, and that a part, formed by the link of the two neighboring links 2 which is shown here on the right, of the running surface 10 has a pin 13. The pin 13 engages in the recess 12, thus forming a gap 14.

A roller 11 is furthermore indicated in dotted lines. The roller 11 is not part of the two links 2 illustrated and instead is part of a link 2 from the other run of the line-guiding device 1. If the two links 2 illustrated are, for example, part of the lower run 5, the roller 11 is part of a link 2 of the upper run 3. The roller 11 can roll on the running surface 10. For this purpose, the roller 11 has a rolling surface 15.

By virtue of the design of the running surface 10 with the recess 12 and the pin 14, the roller 11 can be in contact at all times with a part of the running surface 10 at the transition between the two neighboring links 2. As a result, the generation of noise and loss of energy at the transition between the two neighboring links 2 can be avoided.

It can be seen in FIG. 2 that the rolling surface 15 is narrower than the recess 12 transversely to the direction of travel 16 of the line-guiding device 1. It can moreover be seen that the recess 12 has a length 22 in the direction of travel 16 of the line-guiding device 1 which is greater than a gap width 18 of the gap 14. It can also be seen that the gap 14 between the edges 17 of the running surface 10 transversely to the direction of travel 16 of the line-guiding device 1 is designed to be continuous. The gap width 18 is between 2 and 20% of the extent 19 of the running surface 10 transversely to the direction of travel 16 of the line-guiding device 1.

FIG. 3 shows a side view of side tabs 9 of some links 2, in a bent position, of the line-guiding device 1 from FIG. 1. Each of the links 2 has two opposite side tabs 9. Of these two side tabs 9, in each case one side tab 9 for a plurality of links 2 is shown in FIG. 3. Each of the side tabs 9 has in each case an inner tab 23, 24 (which can be seen in FIG. 5), an outer tab 25, 26, and a central tab 27, 28. In this respect, three and a half side tabs 9 are shown in FIG. 3. The central tab 27 shown on the far right in FIG. 3 is part of a side tab 9 shown only incompletely. In the view in FIG. 3, the inner tabs 23, 24 are covered by the outer tabs 25, 26 shown. The middle one of the complete side tabs 9 shown has a roller 11 (which can be seen in FIG. 5) and the two side tabs 9 shown completely and arranged next thereto have no roller. The rollerless side tabs 9 each have a first inner tab 23 and a first outer tab 25. The side tab 9 with the roller 11 has a second inner tab 24 and a second outer tab 26. A first central tab 27 is arranged in each case between two rollerless side tabs 9. It is therefore envisaged to connect rollerless side tabs 9 to the right and left of the side tabs 9 shown. A second central tab 28 is arranged between a rollerless side tab 9 and a side tab 9 with a roller 11.

It can be seen in FIG. 3 that the individual pairs of in each case an inner tab 23, 24 and an outer tab 25, 26 can be pivoted relative to the central tabs 27, 28 about pivot axes 6. In this respect, on the one hand, the links 2 are connected to one another in an articulated fashion. On the other hand, the pair of inner tab 23, 24 and outer tab 25, 26 of a link 2 can also be pivoted relative to the central tab 27, 28 of the same link 2. In this respect, the links 2 are also self-pivoting.

The pivot axes 6 are arranged closer to the loop inner side 7 than the loop outer side 8. It is also indicated that the running surface 10 is formed on the loop inner side 7.

FIG. 4 shows a side view of the side tabs 9 from FIG. 3 in a straight configuration.

FIG. 5 shows a perspective view of the side tabs 9 from FIGS. 3 and 4 in a straight configuration. It can be seen in particular that one of the side tabs 9 shown has a roller 11 projecting from the running surface 10.

FIG. 6 shows a plan view of the running surface 10 at a transition between two neighboring links 2 of the line-guiding device 1 from FIG. 1 with the side tabs 9 from FIGS. 3 to 5 in a straight configuration. A first inner tab 23 and a first outer tab 25 are shown in FIG. 6. They are part of the side tab 9 of a first one of the two links 2 involved in the transition. This side tab 9 is shown incompletely to the extent that the associated central tab is not shown. A second central tab 28 is shown on the right. It is part of the side tab 9 of a second link 2 involved in the transition. This side tab 9 is shown incompletely to the extent that the associated inner tab and the associated outer tab are not illustrated.

The running surface 10 is interrupted at the transition shown between these two neighboring links 2 in such a way that a part, formed by the left-hand one of the two neighboring links 2 shown, of the running surface 10 has a recess 12, and that a part, formed by the right-hand one of the two neighboring links 2 shown, of the running surface 10 has a pin 13 which engages in a recess 12, thus forming a gap 14. The pin 13 is designed so that it is symmetrical with respect to the direction of travel 16 of the line-guiding device 1 and tapers to a tip 20.

The running surface 10 is interrupted by a plurality of depressions 21 in the case of the right-hand one of the two neighboring links 2 shown. The depressions 21 are arranged in pairs in such a way that the running surface 10 is interrupted continuously, transversely to the direction of travel 16 of the line-guiding device 1, by in each case a pair of the depressions 21. The depressions 21 of a pair contact each other at just one point of contact 31. The edges 17 of the running surface 10 are here formed by the edges of the gap 14. Precisely one such pair of depressions 21 is shown in FIG. 6.

FIG. 7 shows a first perspective view of the running surface 10 at the transition also shown in FIG. 6. A width 32 of one of the depressions 21 transversely to the direction of travel 16 of the line-guiding device 1, a length 33 of the depression in the direction of travel 16, and a depth 34 of the depression are indicated in FIG. 7. The depth 34 is in the range of 1 to 20% of the length 33, in particular in the range of 0.5 to 2 mm. The width 32 is in the range of 100 to 300% of the length 33, in particular in the range of 5 to 20 mm.

FIG. 8 shows a first perspective view of the running surface 10 at the transition also shown in FIGS. 6 and 7. Two cross-pieces 29 can also be seen here. The cross-pieces 29 connect the side tabs 9 situated opposite each other. The opposite side tabs 9 form two tracks 35 situated opposite each other, one of which can be seen in FIG. 8.

FIG. 9 shows a first side view of a side tab 9 and a roller 11, rolling thereon counter to the direction of travel 16, with a rolling surface 15 of the line-guiding device 1 from FIG. 1. It can be seen that a collection of liquid 30 is formed on the running surface 10 on the loop inner side 7 by virtue of the movement of the roller 11.

FIG. 10 shows a second side view of the side tab 9 from FIG. 9. A different section of the side tab 9 is here shown in FIG. 10 than in FIG. 9. A depression 21 is present in the section shown in FIG. 10. As indicated by an arrow, the liquid from the collection of liquid 30 can drain through the depression. This can improve the adhesion of the roller 11 to the running surface 10.

LIST OF REFERENCE NUMERALS 1 line-guiding device
2 link
3 upper run
4 deflection region
5 lower run
6 pivot axis
7 loop inner side
8 loop outer side
9 side tab
10 running surface
11 roller
12 recess
13 pin
14 gap
15 rolling surface
16 direction of travel
17 edge
18 gap width
19 extent
20 tip
21 depression
22 length
23 first inner tab
24 second inner tab
25 first outer tab
26 second outer tab
27 first central tab
28 second central tab
29 cross-piece
30 collection of liquid
31 point of contact
32 width
33 length
34 depth
35 track

The invention claimed is:

1. A line-guiding device, comprising a plurality of links which are connected to one another in an articulated fashion and form a loop consisting of an upper run, a deflection region, and a lower run, wherein neighboring links are pivotable relative to each other about a respective pivot axis, wherein the respective pivot axis is, at least in a case of some of the neighboring links, arranged closer to a loop inner side than a loop outer side, wherein the neighboring links each have two side tabs situated opposite each other, wherein the side tabs of the neighboring links form at least one running surface on the loop inner side, wherein at least the some of the neighboring links have a respective roller arranged in a recess and projecting from the at least one running surface, wherein the upper run and the lower run are bearable against each other via the at least one running surface in such a way that the upper run and the lower run are moveable relative to each other by the rollers, and wherein the at least one running surface is interrupted at the at least the some of the neighboring links by a plurality of depressions.

2. The line-guiding device as claimed in claim 1, wherein depressions in the plurality of depressions are arranged in pairs in such a way that, in each case, one pair of depressions continuously interrupts the at least one running surface between edges of the at least one running surface transversely to a direction of travel of the line-guiding device.

3. The line-guiding device as claimed in claim 1, wherein depressions in the plurality of depressions are arranged in pairs, and wherein depressions of a pair contact each other at just one point of contact.

4. The line-guiding device as claimed in claim 1, wherein each of the side tabs of the neighboring links in each case has an inner tab, an outer tab, and a central tab, and wherein depressions in the plurality of depressions are provided only on the central tabs.

5. The line-guiding device as claimed in claim 1, wherein depressions in the plurality of depressions have a respective depth in the range of 1 to 20% of their length in a direction of travel of the line-guiding device.

6. The line-guiding device as claimed in claim 1, wherein depressions in the plurality of depressions have a respective depth in the range of 0.5 to 2 mm.

7. The line-guiding device as claimed in claim 1, wherein depressions in the plurality of depressions have a respective width transversely to a direction of travel of the line-guiding device in the range of 100 to 300% of their respective length in the direction of travel of the line-guiding device.

8. The line-guiding device as claimed in claim 1, wherein depressions in the plurality of depressions have a respective width transversely to a direction of travel of the line-guiding device in the range of 5 to 20 mm.

9. The line-guiding device as claimed in claim 1, wherein the at least one running surface is interrupted at at least some transitions between the neighboring links in such a way that a part, formed by a first one of two of the neighboring links, of the at least one running surface has a recess, and that a part, formed by a second one of the two of the neighboring links, of the at least one running surface has a pin which engages in the recess, thus forming a gap.

* * * * *